United States Patent
Titschert et al.

(10) Patent No.: US 7,643,262 B2
(45) Date of Patent: * Jan. 5, 2010

(54) PROTECTION CIRCUIT FOR INTRINSICALLY SAFE ELECTRO-MAGNETIC ACTUATORS AND A PROTECTION CIRCUIT FOR INTRINSICALLY SAFE ENERGY SUPPLY SYSTEMS

(75) Inventors: Jens Titschert, Lunen (DE); Markus Lenzing, Selm (DE); Jeff Travis, Fairmont, WV (US); Dan Ferguson, McKees Rocks, PA (US)

(73) Assignee: DBT GmbH, Lunen (DE)

( * ) Notice: Subject to any disclaimer, the term of this patent is extended or adjusted under 35 U.S.C. 154(b) by 197 days.

This patent is subject to a terminal disclaimer.

(21) Appl. No.: 11/334,607

(22) Filed: Jan. 18, 2006

(65) Prior Publication Data

US 2006/0187605 A1    Aug. 24, 2006

(30) Foreign Application Priority Data

Jan. 19, 2005    (DE) .................. 10 2005 002 648

(51) Int. Cl.
   *H02H 3/20* (2006.01)
(52) U.S. Cl. .................. 361/91.1; 361/56; 361/111
(58) Field of Classification Search .......... 361/93.1, 361/56, 91.1, 111
   See application file for complete search history.

(56) References Cited

U.S. PATENT DOCUMENTS

| | | | | |
|---|---|---|---|---|
| 4,178,619 A | * | 12/1979 | Seiler et al. ............. | 361/91.6 |
| 4,551,643 A | * | 11/1985 | Russell et al. ............. | 327/428 |
| 4,665,459 A | * | 5/1987 | Bynum et al. ............. | 361/91.6 |
| 4,740,202 A | * | 4/1988 | Stacey et al. ............. | 604/119 |
| 5,381,297 A | * | 1/1995 | Weber ............. | 361/153 |
| 5,806,522 A | * | 9/1998 | Katims ............. | 600/554 |
| 6,137,192 A | * | 10/2000 | Staffiere ............. | 307/130 |
| 2001/0026431 A1 | * | 10/2001 | Mechanic ............. | 361/111 |
| 2003/0160200 A1 | * | 8/2003 | Suilmann et al. .......... | 251/129.18 |

FOREIGN PATENT DOCUMENTS

JP          63003689      *  1/1988

OTHER PUBLICATIONS

Paul Horowitz, The Art of Electronics, 2006, The Press Syndicate of the University of Cambridge, Second Edition, 229-230.*
U.S. Mine Safety and Health Administration, Criteria for the Evaluation and Test of Intrinsically Safe Apparatus and Associated Apparatus, Aug. 8, 1995, p. 53.

* cited by examiner

*Primary Examiner*—Danny Nguyen
*Assistant Examiner*—Tien Mai
(74) *Attorney, Agent, or Firm*—Cook Alex Ltd.

(57) ABSTRACT

A protection circuit for intrinsically safe electromagnetic actuators operating on the voltage from a power unit (1) approved for underground mining, for switching electrohydraulic valves (5) in underground mining, comprising at least two spaced-apart short-circuit means (14, 16 or 16A) connected in parallel with the electromagnetic actuator coil (11) for short-circuiting the coil in the event of a reversal of the coil voltage. According to the invention, at least one of the short-circuit means comprises a short-circuit semi-conductor switch (16 or 16A) and a voltage-reversal detecting circuit (30) for activating the short-circuit semiconductor switch (16).

26 Claims, 2 Drawing Sheets

PROTECTION CIRCUIT FOR INTRINSICALLY SAFE ELECTRO-MAGNETIC ACTUATORS AND A PROTECTION CIRCUIT FOR INTRINSICALLY SAFE ENERGY SUPPLY SYSTEMS

CROSS REFERENCE TO RELATED APPLICATION

This patent application claims a right of priority to German patent application Ser. No. 10 2005 002 648.6, filed on Jan. 19, 2005.

FIELD OF THE INVENTION

The present invention relates to a protection circuit for intrinsically safe electromagnetic actuators operated by the voltage from a power supply approved for underground mining, for switching electrohydraulic valves in underground mining, wherein the A protection circuit comprises at least two spaced-apart short-circuit means connected in parallel with the electromagnetic actuator coil, for short-circuiting the coil in the event of a reversal of the coil voltage. The present invention also relates to a protection circuit for intrinsically safe underground energy supply systems comprising a number of electronic control units connected to a common power supply approved for underground mining, for activating respective electromagnetic actuators connected to the control units and operated by the power-supply voltage for switching electrohydraulic valves in underground mining, wherein each electromagnetic actuator in the energy supply system is associated with at least one short-circuit means connected in parallel with the coil of the electromagnet for short-circuiting the coil in the event of a reversal of the coil voltage.

BACKGROUND OF THE INVENTION

In underground mining the hydraulic operations, usually effected via hydraulic cylinders or hydraulic props, are initiated by a number of electromagnetic actuators for switching electrohydraulic valves for the hydraulic cylinders. The large number of electrohydraulic valves for switching, for example in powered shield-type movable supports, place especially exacting requirements on the power supplies and the available underground energy supply system, and furthermore both the power supplies and the energy supply systems must be intrinsically safe and meet all the requirements regarding protection from explosions and/or other forms of ignition. Since this involves limiting the installed electric loads made available by the power supply, it is conventional in underground mining to provide the electromagnetic actuators with holding-current lowering means. Also the large inductive loads in the intrinsically safe energy supply systems make it necessary to take special precautions to ensure conformity with the anti-ignition regulations.

One known problem in the case of electromagnetic actuators with energised coils is the residual energy pulse after cutting off the inductive load. As a counter-measure in existing underground mining, all electromagnetic actuators are provided with at least two short-circuit means in the form of free-wheeling diodes which short-circuit the coil in the event of a reversal of the coil voltage, in order in all cases to avoid voltage peaks of the cut-off energy or of the residual energy pulse. The magnetic field, which collapses when the coil is switched off, induces a voltage in the coil with the opposite polarity from the connected voltage, and this polarity change, hereinafter referred to by the general term "voltage reversal", unlocks the freewheeling diode so that a current flows through it for dissipating the magnetic field of the coil.

However, in underground energy supply systems comprising a number of simultaneously switched electromagnetic actuators, the residual cut-off energy pulse resulting for example from a broken cable or the like, even if reduced by freewheeling diodes, will result in a total pulse beyond that permitted by the anti-ignition regulations.

An aim of the invention is to devise a protection circuit for electromagnetic actuators or for intrinsically safe underground energy supply systems wherein even under unfavourable conditions such as a broken cable or power failure, there is no overall pulse resulting in gas ignition or other operating states not permitted by the anti-ignition regulations.

SUMMARY OF THE INVENTION

Accordingly the present invention is directed to a protection circuit wherein at least one short-circuit means comprises a short-circuit semiconductor switch and a circuit for detecting a reversal of the coil voltage, the short-circuit semiconductor switch being activated by the detection circuit. According to the present invention therefore, the field coil of the electromagnets is short-circuited by a short-circuit semiconductor switch with low resistance within times considerably shorter than those obtainable with freewheeling diodes, wherein the short-circuited state or the short-circuiting of the inductive load by the quick-acting short-circuit semiconductor switches effectively prevents an appreciable backflow of energy into the energy supply system or the power supply.

Since the anti-ignition regulations require that all protective circuitry must be redundant, in one possible construction each short-circuit means must comprise at least one detecting circuit with a short-circuit semiconductor switch. Alternatively one short-circuit means can be in the form of a freewheeling diode as before and at least or only one of the other short-circuit means can comprise the detection circuit and the short-circuit semiconductor switch.

The invention can be worked inter alia if each individual electromagnetic actuator is associated with a protection circuit according to the invention, which will require all electromagnetic actuators to be renewed or retrofitted. In underground intrinsically-safe energy supply systems comprising conventional, that is not retrofitted, electromagnets, alternatively or additionally at least one short-circuit means comprising a short-circuit semiconductor switch and a detecting circuit can be a component of an additional circuit, wherein the additional circuit is preferably disposed in a ballast or the like. In underground energy supply systems, a number of control units are connected to a common power supply. Advantageously, therefore, each control unit is associated with an additional circuit, especially a ballast. The additional circuit or ballast can be disposed directly in front of or behind the control unit, especially in the energy supply branch.

Another basic problem in underground mining is the limited supply capacity of the power supplies used. In power supply systems approved in Germany, for example, the maximum available current is limited to about 2.2 amps, whereas 8-amp power supplies are permitted in the USA. In order nevertheless to connect a power supply to a number of electronic control units for actuating the electromagnetic actuators, it is advantageous if each electronic control unit is associated with a current-limiting circuit. The current-limiting circuit can be incorporated in the electronic control unit. Alternatively the current-limiting circuit can be a component of a ballast, especially the ballast incorporating the additional circuit. The current-limiting circuit can especially comprise an additional short-circuit semiconductor switch and a monitoring circuit which activates the short-circuit semiconductor switch of the power-limiting circuit when a set amperage is reached, so that all the electromagnetic actuators connected to the electronic control unit are switched off when the monitoring circuit detects that the set total power consumption or amperage of all the electromagnetic actuators has been exceeded.

The detecting circuit for activating the short-circuit semiconductor switch for short-circuiting the coil preferably comprises an operational amplifier which especially can also be in the form of a comparator. In one possible example embodiment the operational amplifier can be equipped with an inverter. The detecting circuit can especially comprise a transistor with a downstream pull-up resistor connected to one of the inputs of the short-circuit semiconductor switch.

The short-circuit semiconductor switch can especially comprise a transistor, wherein a simple circuit can be constructed with an FET (field-effect transistor). The short-circuit semiconducting switch may also especially comprise a thyristor. Advantageously also, the protective circuitry comprises a separate energy supply for the detecting circuit, in the form of an energy buffer storage chargeable with the power-supply voltage when the coil is energised. The energy buffer storage, which is charged when the electromagnetic actuator coil is actuated, supplies energy to the detecting circuit even when the coil is discharged by the short-circuit semiconductor switch and if required by the freewheeling diodes and the power supply voltage is not available. In a preferred construction the separate energy buffer storage is designed to keep the semiconductor switch short-circuited until the electromagnetic actuator coil has been completely discharged. If at least one short-circuit means comprises a freewheeling diode, the energy buffer storage can be made correspondingly small. In a preferred embodiment the energy buffer storage comprises a capacitor.

BRIEF DESCRIPTION OF THE DRAWINGS

Examples of protection circuits made in accordance with the present invention will now be described hereinbelow with reference to the accompanying drawings, in which.

DESCRIPTION OF THE PREFERRED EMBODIMENTS

Figures 1, 4:
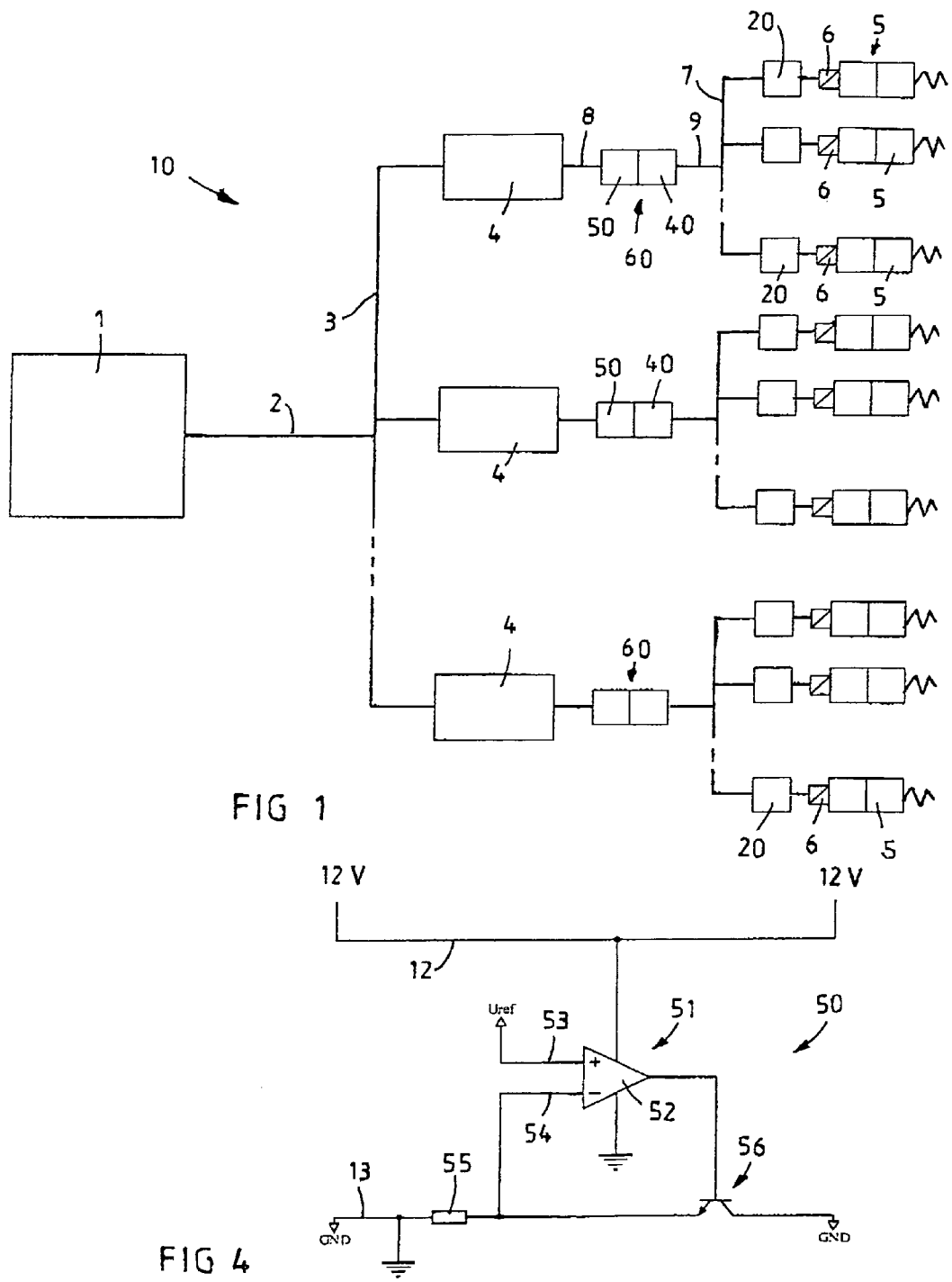
FIG. 1 shows a diagram of an underground energy supply system for electronic control units connected to electromagnetic valves.
FIG. 4 is an example embodiment of a current-limiting circuit usable in accordance with the present invention.

In FIG. 1 an intrinsically safe underground energy supply system 10 is shown diagrammatically by way of example only. The energy supply system 10 comprises an intrinsically safe power supply 1, approved for operation in underground mining, in the form of an for example 12-volt DC source, to which a number of electronic control units 4 are connected via a power line 2 and power branch lines 3 and are supplied with the necessary energy. Each electronic control unit 4 can for example be associated with an underground movable support frame and can operate all the controls thereof. In the case of the electronic control units 4, it is customary, for example, for each electronic control unit 4 to actuate a total of sixteen electrohydraulic valves 5 with spring resetting and an actuator in the form of an electromagnet 6 for the valve 5. To this end each electromagnetic actuator 6 electrically connected via an actuating line 7 to the electronic control unit 4, the connection being made via a valve-actuating rail or strip (not shown) as conventional in underground mining. In conventional energy supply systems, a power supply 1 actuates for example eight electronic control units 4 with a total of sixteen downstream electromagnetic valves 5, 6. The construction of an electronic supply system 10 without the additional protective circuitry 20 and/or 40 shown in FIG. 1 and/or without a current-limiting circuit 50 is known in the prior art.

Figure 2:
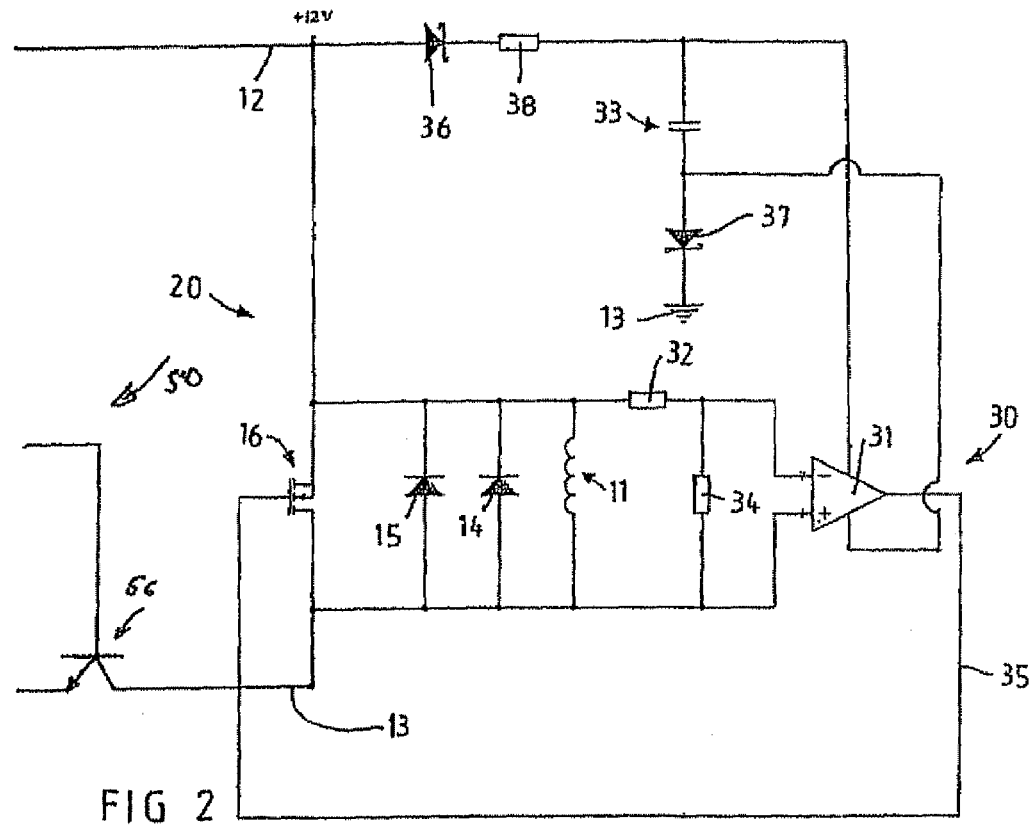
FIG. 2 shows a protection circuit for the coil of an electromagnetic actuator according to a first example embodiment.
Figure 3:
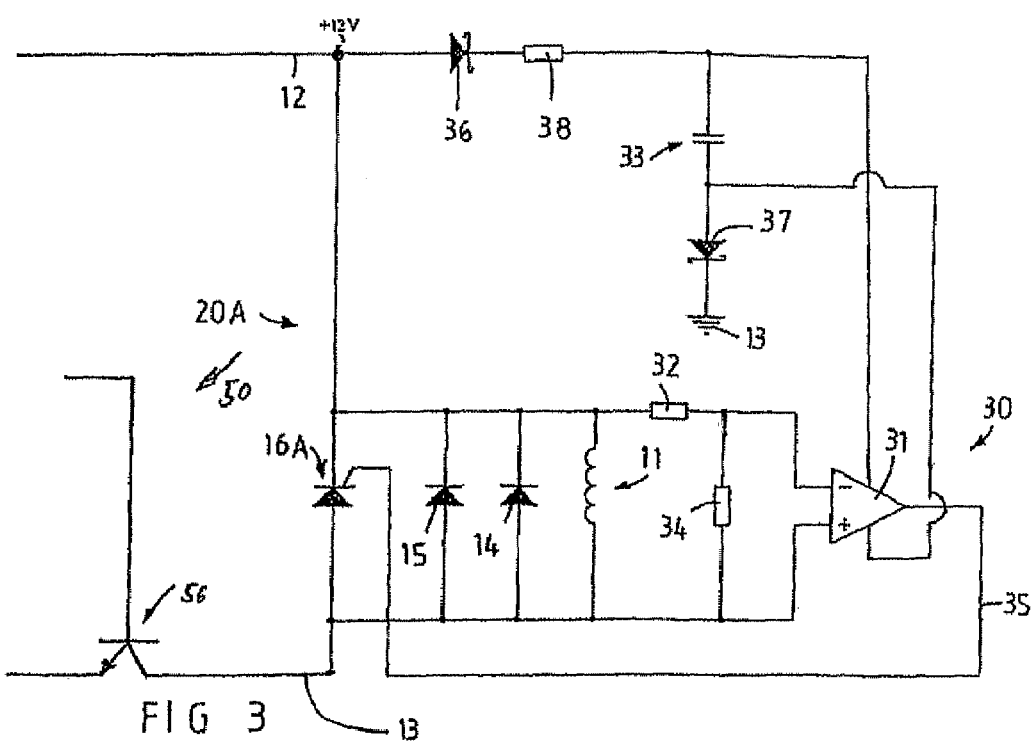
FIG. 3 shows A protection circuit for the coil of an electromagnetic actuator according to a second example embodiment.

According to a first example embodiment of the present invention, each electromagnetic actuator 6 of an electrohydraulic valve 5 can be associated with a protection circuit 20, two possible example embodiments of which are shown in FIGS. 2 and 3.

In the example embodiment of a protection circuit 20 shown in FIG. 2, the electromagnetic actuator is symbolically represented by its coil 11 alone. Depending on the switching state of the electromagnetic actuator 6, the coil is electrically connected to the power supply voltage via lines 12 or 13, so that the electrohydraulic valve (5, FIG. 1) is switched by energising the coil 11. The terminal line 12 in this case is shown as a +12 volt line. In the example embodiment shown, as conventional in the prior art, the ignition-preventing means for uncoupling the cut-off energy of the inductive load of the coil 11 is at least one short-circuit means in the form of a freewheeling diode 14 parallel with the coil. Since all protective precautions in underground mining must be made redundant, a second freewheeling diode 15 is connected in parallel with the coil. According to the invention also, the circuit 20 comprises an additional short-circuit means, that is a detecting circuit 30 connected in parallel with the coil 11 and a field-effect transistor 16 activatable by the detecting device 30 in the event of a voltage reversal and thus short-circuiting the coil 11. By means of the field-effect transistor 16, the coil 11 can be quickly short-circuited at a very low resistance, and a backflow of the inductive load of the coil 11 into the terminal lines 12, 13 is prevented. In the example embodiment shown, the detecting circuit 30 comprises an operational amplifier 31 connected via a series resistor 32 in parallel with the coil 11. The supply of energy to the operational amplifier 31 is ensured by a capacitor 33, which is always charged when the coil 11 and consequently the electromagnetic actuator is energised. The storage capacity of the capacitor 33 is made sufficient to supply the operational amplifier with operating voltage at least as long as necessary for dissipating the residual energy of the coil 11 via the freewheeling diodes 14, 15, the field-effect transistor 16 and an additional resistor 34 connected in parallel with the coil 11. The field-effect transistor 16 is actuated via the actuating line 35, so that it short-circuits the coil 11, a backflow from the capacitor 33 into the potential lines 12 or 13 via the Z-diodes 36, 37 is prevented, and the voltage for charging the capacitor 33 is controlled via the series resistor 38. The operational amplifier 31 detects any reversal of the voltage applied to its inputs, wherein the voltage reversal can be brought about only by the cut-off energy of the coil 11.

FIG. 3 shows an alternative example embodiment 20A of a protection circuit for the coil 11 of an electro-magnetic actuator. Components serving the same purpose as in the example embodiment in FIG. 2 are given identical reference numbers. In this case, in contrast to the first example embodiment, the operational amplifier 31 for the detecting circuit 30 does not control a field-effect transistor but a thyristor 16A, which can however short-circuit the coil 11 very quickly and with low resistance, like the field-effect transistor in the previous example embodiment.

FIGS. 2 and 3 also show the transistor 56 as mentioned below with reference to FIG. 4. Transistor 56 in FIGS. 2 and 3 is the same transistor as also shown in FIG 4, to better illustrate the interconnection of the circuit 20 or 20A in FIG. 2 or 3 with the circuit 50 in FIG. 4.

The previously described protective circuitry 20 and 20A can be associated with each electromagnetic actuator 6 as diagrammatically shown in FIG. 1. At least one freewheeling diode is used, thus ensuring that the A protection circuit can be constructed with double or triple redundancy with short-circuit semi-conductor switches in the form of a transistor or field-effect transistor or thyristor. However, a protection circuit of this construction must be associated with each electromagnetic actuator, so that protective circuitry of this construction cannot be retrofitted on existing underground longwall systems or underground energy supply systems.

In existing energy supply systems the invention can be embodied in the form of the A protection circuit indicated by reference 40 and/or by a power-limiting circuit indicated by reference 50. In this case both the A protection circuit 40 comprising the detecting circuit and short-circuit semiconductor switch and the power-limiting circuit 50 are associated with a respective electronic control unit 4, wherein both circuits 40, 50 can be incorporated for example in a ballast or separate unit 60 with plug connections for lines 8, 9. Alternatively the current-limiting circuit 50 can be a direct component of an electronic control unit or the like, in which case only each protective circuit 40 will be disposed in a suitable ballast. The protective circuitry 40 can be basically similar in construction to the example embodiments in FIGS. 2 and 3, except that the detecting circuit and the short-circuit semiconductor switch will at least be duplicated to provide the wiring with overall redundancy. In that case also the detecting circuit and the short-circuit semiconductor switch will be connected in parallel not with a single coil but with all the coils of all the electromagnetic actuators for an electronic control unit.

A power-limiting circuit 50 can be constructed for example as shown in FIG. 4. A monitoring circuit 51 connected between the two terminal lines 12, 13 comprises an operational amplifier 52 having one input connected to a reference voltage $U_{ref}$ as shown by a signal line 53 and its other input connected as shown via a signal line 54 and a resistor 55 to a voltage which depends on the power consumption of all the electrohydraulic valves connected to the associated electronic control unit. In underground mining the delivery capacity of each power supply is limited, so that not more than for example five electro-hydraulic valves can or should be simultaneously actuated by any electromagnetic control unit. If some of the electrohydraulic valves are in the holding-current state, the number can of course be correspondingly greater. The voltage tapped at the resistor 55 will be equal to the total power consumption of all the downstream electrohydraulic valves. If the voltage applied to the input 54 exceeds the reference voltage $U_{ref}$ at the input 53, the fact will be detected by the monitoring circuit 51 and the operational amplifier 52 will activate the short-circuit semiconductor switch, in the form of a transistor 56 here, incorporated in the energy supply system. The power-limiting circuit 50 thus prevents any of the electrohydraulic valves (5, FIG. 1) or their electromagnetic actuators (6, FIG. 1) consuming more current than set by the reference voltage $U_{ref}$. The permitted total power consumption can be adjusted by altering the level of the reference voltage $U_{ref}$.

Numerous modifications to the preceding description will be clear to the skilled man and are to be included in the scope of protection of the accompanying claims. Instead of the freewheeling diodes, the protective circuitry can alternatively comprise a number of detecting circuits and associated short-circuit semiconductor switches. The power-limiting circuit can be disposed together with or separately from the detecting circuit and the short-circuit semiconductor switch. These circuits can also be incorporated in a valve actuating rail or the like. Alternatively the power-limiting circuitry can be in the form of other known switching systems.

The invention claimed is:

1. A protection circuit for intrinsically safe electromagnetic actuators operating on a voltage from a power unit approved for underground mining, for switching electrohydraulic valves in underground mining, comprising at least two parallel spaced-apart short-circuit means connected in parallel with an electromagnetic actuator coil for short-circuiting the coil in the event of a reversal of the coil voltage, in which at least one of the short-circuit means comprises a short-circuit semi-conductor switch and a voltage-reversal detecting circuit for activating the short-circuit semiconductor switch.

2. The protection circuit according to claim 1 further comprising an electronic control unit wherein each electronic control unit is associated with a power-limiting circuit.

3. The protection circuit according to claim 1 wherein the detecting circuit comprises an operational amplifier.

4. The protection circuit according to claim 1 wherein the detecting circuit is in the form of a comparator.

5. A protection circuit according to claim 1 wherein the voltage-reversal detecting circuit comprises an operational amplifier, and the operational amplifier is in the form of a comparator.

6. The protection circuit according to claim 1 wherein the short-circuit semiconductor switch comprises a transistor.

7. The protection circuit according to claim 6 wherein the short-circuit semiconductor switch comprises a field effect transistor.

8. The protection circuit according to claim 1 wherein the short-circuit semiconductor switch comprises a thyristor.

9. The protection circuit according to claim 1 further comprising an energy buffer storage chargeable with the voltage of the power supply when the coil is energised and constituting a separate energy supply for the detecting circuit.

10. The protection circuit according to claim 9 wherein the energy buffer storage ensures that the short-circuit semiconductor switch remains short-circuited until complete discharge of the coil.

11. The protection circuit according to claim 9 wherein the energy buffer storage comprises a capacitor.

12. A protection circuit for intrinsically safe underground energy supply systems comprising a number of electronic control units connected to a common power supply approved for underground mining, for activating respective electromagnetic actuators connected to the control units and operated by the power-supply voltage for switching electrohydraulic valves in underground mining, wherein each electromagnetic actuator is associated with at least one short-circuit means connected in parallel with a coil of the electromagnet for short-circuiting the coil in the event of a reversal of the coil voltage, in which the protection circuit comprises at least one additional short-circuit means having a short-circuit semiconductor switch and a voltage-reversal detecting circuit for activating the short-circuit semiconductor switch.

13. The protection circuit according to claim 12, in which at least one short-circuit means is a component of an additional circuit, the additional circuit preferably being disposed in a ballast.

14. The protection circuit according to claim 12, in which each control unit connected to the power supply is associated with an additional circuit.

15. The protection circuit according to claim 14, in which the power supply is associated with a ballast.

16. The protection circuit according to claim 14, in which a current-limiting circuit is a component of a ballast.

17. The protection circuit according to claim 12 wherein each electronic control unit is associated with a power-limiting circuit.

18. The protection circuit according to claim 12 wherein the detecting circuit comprises an operational amplifier.

19. The protection circuit according to claim 12 wherein the detecting circuit is in the form of a comparator.

20. The protection circuit according to claim 12 wherein the voltage-reversal detecting circuit comprises an operational amplifier, and the operational amplifier is in the form of a comparator.

21. The protection circuit according to claim 12 wherein the short-circuit semiconductor switch comprises a transistor.

22. The protection circuit according to claim 21 wherein the short-circuit semiconductor switch comprises a field-effect transistor.

23. The protection circuit according to claim 12 wherein the short-circuit semiconductor switch comprises a thyristor.

24. The protection circuit according to claim 12 further comprising an energy buffer storage chargeable with the voltage of the power supply when the coil is energized and constituting a separate energy supply for the detecting circuit.

25. The protection circuit according to claim 24 wherein the energy buffer storage ensures that the short-circuit semiconductor switch remains short-circuited until complete discharge of the coil.

26. The protection circuit according to claim 24 wherein the energy buffer storage comprises a capacitor.

* * * * *

UNITED STATES PATENT AND TRADEMARK OFFICE
CERTIFICATE OF CORRECTION

| | | |
|---|---|---|
| PATENT NO. | : 7,643,262 B2 | |
| APPLICATION NO. | : 11/334607 | |
| DATED | : January 5, 2010 | |
| INVENTOR(S) | : Titschert et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 290 days.

Signed and Sealed this

Sixteenth Day of November, 2010

David J. Kappos
*Director of the United States Patent and Trademark Office*